United States Patent
Grøtterud

(10) Patent No.: US 10,794,389 B2
(45) Date of Patent: Oct. 6, 2020

(54) LOAD-SHARING IN PARALLEL FLUID PUMPS

(71) Applicant: FMC Kongsberg Subsea AS, Kongsberg (NO)

(72) Inventor: Helge Grøtterud, Kongsberg (NO)

(73) Assignee: FMC Kongsberg Subsea AS, Kongsberg (NO)

(*) Notice: Subject to any disclaimer, the term of this patent is extended or adjusted under 35 U.S.C. 154(b) by 375 days.

(21) Appl. No.: 15/735,591

(22) PCT Filed: Jun. 9, 2016

(86) PCT No.: PCT/EP2016/063104
§ 371 (c)(1),
(2) Date: Dec. 11, 2017

(87) PCT Pub. No.: WO2016/198497
PCT Pub. Date: Dec. 15, 2016

(65) Prior Publication Data
US 2018/0314270 A1    Nov. 1, 2018

(30) Foreign Application Priority Data
Jun. 11, 2015 (NO) .................................. 20150759

(51) Int. Cl.
*F04D 27/02* (2006.01)
*F04B 17/03* (2006.01)
(Continued)

(52) U.S. Cl.
CPC .......... *F04D 27/0284* (2013.01); *F04B 17/03* (2013.01); *F04B 49/065* (2013.01);
(Continued)

(58) Field of Classification Search
CPC .... F04B 15/02; F04B 17/03; F04B 23/04–14; F04B 37/20; F04B 41/06; F04B 47/00;
(Continued)

(56) References Cited

U.S. PATENT DOCUMENTS 3,511,579 A * 5/1970 Gray .................... F04D 15/029
417/6
4,581,900 A * 4/1986 Lowe .................... F04D 27/001
415/17

(Continued)

FOREIGN PATENT DOCUMENTS

CA    2 586 674 A1    10/2007
EP    0 305 761 A2    8/1988
(Continued)

*Primary Examiner* — Alexander B Comley

(57) ABSTRACT

A method of sharing load between a plurality of parallel fluid pumps in a subsea fluid pumping system having first and second pumping units, each of which includes a respective first and second pump, the method including establishing a pump limit characteristics diagram for the first pumping unit by mapping a minimal allowable torque of the first pumping unit as a function of a differential pressure across the first pump, identifying a permissible operating region of the first pumping unit defined by a set of minimum allowable torque values for the first pumping unit, establishing a pump limit characteristics diagram for the second pumping unit by mapping a minimal allowable torque of the second pumping unit as a function of a differential pressure across the second pump, identifying a permissible operating region of the second pumping unit defined by a set of minimum allowable torque values for the second pumping unit, monitoring the torque of the first pumping unit and the differential pressure across the first pump, acquiring a monitored torque value ($T_m a$) and a monitored differential pressure value ($DP_m a$) of the first pumping unit, identifying the minimum allowable torque value ($T_0 a$) of the first pumping unit corresponding to
(Continued)

the monitored differential pressure value ($DP_m a$) of the first pumping unit, monitoring the torque of the second pumping unit and the differential pressure across the second pump, acquiring a monitored torque value ($T_m b$) and a monitored differential pressure value ($DP_m b$) of the second pumping unit, identifying the minimum allowable torque value ($T_0 b$) of the second pumping unit corresponding to the monitored differential pressure value ($DP_m b$) of the second pumping unit, and regulating the rotational speed of the first and second pumps such that $T_m a/T_0 b$ equals $T_m b/T_0 b$.

7 Claims, 2 Drawing Sheets

(51) Int. Cl.
| | |
|---|---|
| *F04B 49/06* | (2006.01) |
| *F04D 15/02* | (2006.01) |
| *F04D 13/08* | (2006.01) |
| *F04D 15/00* | (2006.01) |
| *F04D 31/00* | (2006.01) |
| *F04D 13/12* | (2006.01) |
| *F04B 23/04* | (2006.01) |
| *F04B 41/06* | (2006.01) |
| *F17D 5/00* | (2006.01) |
| *G05D 7/06* | (2006.01) |

(52) U.S. Cl.
CPC ........... *F04D 13/086* (2013.01); *F04D 13/12* (2013.01); *F04D 15/0066* (2013.01); *F04D 15/029* (2013.01); *F04D 15/0236* (2013.01); *F04D 27/0207* (2013.01); *F04D 27/0261* (2013.01); *F04D 31/00* (2013.01); *F04B 23/04* (2013.01); *F04B 41/06* (2013.01); *F05D 2270/335* (2013.01); *F17D 5/00* (2013.01); *G05D 7/0635* (2013.01)

(58) Field of Classification Search
CPC .............................. F04B 47/06; F04B 49/007; F04B 49/03–035; F04B 49/06–065; F04B 49/20; F04D 13/08; F04D 13/12; F04D 15/0236; F04D 15/029; F04D 27/001; F04D 27/02–0223; F04D 27/0238; F04D 27/0261–0269; F04D 31/00; F04D 15/0066; F04D 27/0284
See application file for complete search history.

(56) References Cited

U.S. PATENT DOCUMENTS

| | | | | |
|---|---|---|---|---|
| 4,894,069 A * | 1/1990 | Arnaudeau | ............ | F17D 1/005 95/187 |
| 5,393,202 A * | 2/1995 | Levallois | ............... | E21B 43/12 417/19 |
| 5,508,943 A * | 4/1996 | Batson | ............... | F04D 27/0207 700/287 |
| 6,007,306 A * | 12/1999 | Vilagines | ............... | E21B 43/40 417/307 |
| 6,516,249 B1 * | 2/2003 | Hoyle | ............... | F04B 49/065 700/282 |
| 6,564,627 B1 * | 5/2003 | Sabini | ............... | F04D 15/0088 417/19 |
| 8,084,979 B2 * | 12/2011 | Sten-Halvorsen | ... | G01R 31/343 318/469 |
| 8,322,427 B2 * | 12/2012 | Inderberg | ............ | E21B 47/1025 166/336 |
| 9,133,690 B1 * | 9/2015 | Tanju | ...................... | E21B 43/12 |
| 2002/0162402 A1 * | 11/2002 | Henyan | .................... | G01F 1/28 73/861.71 |
| 2005/0281680 A1 * | 12/2005 | Schulz | ............... | E21B 41/0021 417/44.11 |
| 2006/0162934 A1 * | 7/2006 | Shepler | .................... | E21B 17/01 166/370 |
| 2009/0151801 A1 * | 6/2009 | Gorman | ................ | F04D 13/14 137/565.11 |
| 2009/0251086 A1 * | 10/2009 | Sekimoto | ............... | H02P 29/50 318/400.23 |
| 2009/0287357 A1 * | 11/2009 | Scoleri | .................... | F04B 23/08 700/282 |
| 2010/0307619 A1 * | 12/2010 | Komatsu | ............ | F04D 15/0066 137/565.33 |
| 2011/0056699 A1 * | 3/2011 | Bjoroy | .................... | F04B 23/04 166/369 |
| 2012/0014812 A1 * | 1/2012 | Blaiklock | ............ | F04D 27/001 417/26 |
| 2012/0103188 A1 * | 5/2012 | Stinessen | ................ | E21B 43/34 95/24 |
| 2012/0207622 A1 * | 8/2012 | Ebisawa | ................ | F04D 27/001 417/53 |
| 2012/0282115 A1 * | 11/2012 | Du | .......................... | F04B 23/06 417/53 |
| 2013/0002187 A1 * | 1/2013 | Spreen | ................ | H02P 23/0077 318/811 |
| 2013/0323082 A1 * | 12/2013 | Rosinski | ............ | F04D 27/0261 417/19 |
| 2015/0104328 A1 * | 4/2015 | Babbitt | ................ | B01D 61/025 417/2 |
| 2016/0047392 A1 * | 2/2016 | Bernocchi | .......... | F04D 27/0246 415/1 |
| 2016/0177958 A1 * | 6/2016 | Schneider | ............... | F04D 31/00 415/1 |
| 2016/0265520 A1 * | 9/2016 | Skinner, Jr. | ........... | F04B 49/065 |
| 2017/0260982 A1 * | 9/2017 | Grotterud | ................ | F04D 7/04 |

FOREIGN PATENT DOCUMENTS

| | | |
|---|---|---|
| EP | 1 772 960 A1 | 4/2007 |
| WO | WO 2015/024005 A2 | 2/2015 |

* cited by examiner

LOAD-SHARING IN PARALLEL FLUID PUMPS

FIELD OF THE INVENTION

The present invention relates to a method of sharing load between a plurality of parallel fluid pump units in a subsea fluid pumping system comprising:

- a first fluid pumping unit comprising a first pump and a first motor which is drivingly connected to the first pump, which first pump comprises a suction conduit which is in fluid communication with a fluid inlet conduit, and a discharge conduit which is in fluid communication with a fluid outlet conduit,
- a second fluid pump unit comprising a second pump and a second motor which is drivingly connected to the second pump, which second pump comprises a suction conduit which is in fluid communication with the fluid inlet conduit, and a discharge conduit which is in fluid communication with the fluid outlet conduit, thus rendering the second pumping unit parallel to the first pumping unit,
- a return conduit providing a feed-back path for the fluid from the outlet conduit to the inlet conduit, and
- a control valve controlling the flow of the fluid through the return conduit.

Said fluid may be a multiphase fluid or a fluid having a variable density.

BACKGROUND

In a subsea multiphase or variable density fluid pumping system comprising a plurality of parallel fluid pumps, it is generally desirable to allocate the fluid between the parallel pumps such that pumps are loaded evenly. This is especially the case when the pumps are approaching their minimum flow limits, at which limits the pumps run the risk of entering a surge condition. If the pumps are not loaded evenly, one of the pumps may reach its minimum flow limit prior to the other pumps in the system. In such a case, the first pump which reaches the minimum flow limit will trigger the control valve of the return line to open although the other pumps in the system are still operating within their respective permissible operating regions.

This is a problem, since it does not allow for an efficient multiphase or variable density fluid pumping system.

An object of the present invention is to solve or at least alleviate this problem and bring about a method which provides efficient load sharing in a pumping system comprising a plurality of parallel pumping units.

Another object of the invention is to bring about a method which enables the pumping units in the system to reach their minimum flow limits at basically the same time.

SUMMARY OF THE INVENTION

Norwegian patent application No. 20141112 (P23702NO00), which corresponds to U.S. Patent Application Publication No. US2017/0260982 A1 and was filed by the same applicant as the present patent application, discusses a fluid pumping system comprising a pump in which a minimum torque limit is used to control the pump instead of a minimum flow limit. It has been found that this minimum torque control is advantageous, as it is generally independent of the density and the GVF (Gas Volume Fraction) of the multiphase fluid.

The present invention takes advantage of this insight and proposes a method of sharing the load between a plurality of parallel multiphase fluid pumps based on minimum allowable torque values for the pumps.

The method according to the present invention is characterised by the steps of:

- establishing a pump limit characteristics diagram for the first pumping unit by mapping a minimal allowable torque of the first pumping unit as a function of a differential pressure across the first pump and identifying a permissible operating region of the first pumping unit defined by a set of minimum allowable torque values for the first pumping unit,
- establishing a pump limit characteristics diagram for the second pumping unit by mapping a minimal allowable torque of the second pumping unit as a function of a differential pressure across the second pump and identifying a permissible operating region of the second pumping unit defined by a set of minimum allowable torque values for the second pumping unit,
- monitoring the torque of the first pumping unit and the differential pressure across the first pump, acquiring a monitored torque value and a monitored differential pressure value of the first pumping unit, and identifying the minimum allowable torque value of the first pumping unit corresponding to the monitored differential pressure value of the first pumping unit,
- monitoring the torque of the second pumping unit and the differential pressure across the second pump, acquiring a monitored torque value and a monitored differential pressure value of the second pumping unit, and identifying the minimum allowable torque value of the second pumping unit corresponding to the monitored differential pressure value of the second pumping unit, and
- regulating the rotational speed of the first and the second pumps such that the relation between the monitored torque values of the first and second pumping units is the same as the relation between the identified minimum allowable torque values of the first and second pumping units.

Consequently, according to the present invention, load sharing between the parallel pumps are based on identifying minimum allowable torque values for the pumps and regulating the rotational speed of the pumps such that the relation between monitored torques values of the pumps are the same as the relation between the minimum allowable torque values. In this way, when approaching a low-flow condition, the pumps will reach their respective minimum allowable torque value basically simultaneously, at which time the control valve is regulated to open the return line providing a feed-back conduit for the fluid from the outlet conduit to the inlet conduit.

In order to prevent the pumps from entering surge conditions, it may be advantageous to regulate the control valve such that the monitored torque values of the respective pump unit does not fall below the minimum allowable torque value of the pump unit.

It may be advantageous to perform the steps of establishing the pump limit characteristics diagrams for the pumping units prior to operating the pumping system.

The steps of establishing the pump limit characteristics diagrams for the pumping units may advantageously comprise storing the pump limit characteristics diagrams in a control system of the pumping system, e.g. in a look-up table.

The step of storing the pump limit characteristics diagrams in the control system may advantageously comprise storing the pump limit characteristics diagrams in a data storage unit in the control system.

In the following, embodiments of the invention will be disclosed in more detail with reference to the attached drawings.

DETAILED DESCRIPTION OF THE INVENTION

Figure 1:
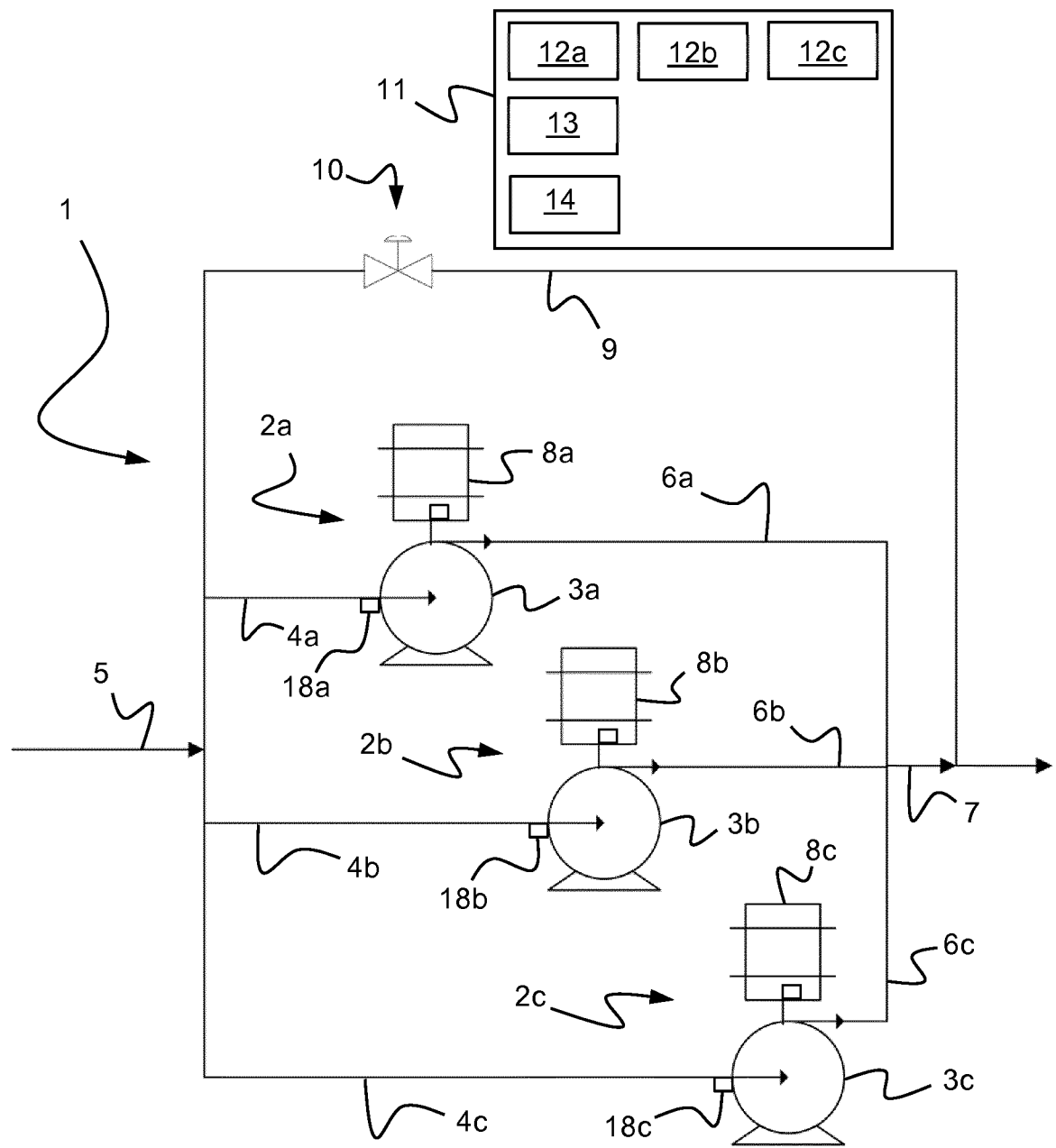
FIG. 1 is a schematic illustration of a pumping system according to the invention.

FIG. 1 discloses a subsea pumping system 1 for pumping a multiphase fluid, e.g. a hydrocarbon gas/liquid mixture, or a variable density fluid. The system 1 comprises three parallel pumping units 2a, 2b, 2c. Each pumping unit 2a, 2b, 2c comprises a pump 3a, 3b, 3c, which advantageously may be a helicoaxial (HAP) or a centrifugal type pump. Each pumping unit 2a, 2b, 2c further comprises a suction conduit 4a, 4b, 4c, which is in fluid communication with a common fluid inlet conduit 5, and a discharge conduit 6a, 6b, 6c, which is in fluid communication with a common fluid outlet conduit 7. Each pumping unit 2a, 2b, 2c also comprises an electric variable speed motor 8a, 8b, 8c, which is connected to and drives the pump 3a, 3b, 3c.

The system 2 further comprises a return line or conduit 9, which provides a feed-back path for the fluid from the outlet conduit 7 to the inlet conduit 5, and a control valve 10 which controls the flow of fluid through the return conduit 9.

The pumping system 1 also comprises a control system 11 for monitoring and controlling the pumping units 2a, 2b, 2c and the control valve 10. The control system 11 comprises a variable speed drives (VSD) 12a, 12b, 12c, one VSD for each motor 8a, 8b, 8c, which are connected to and controls the motors 8a, 8b, 8c. The control system 11 may also comprise a processing unit 13, a data storage unit 14 and other units which are known in the art to be incorporated in control systems for controlling and operating pumping systems. In the figure, signal and control conduits for monitoring and controlling the various components in the system 1, e.g. signal conduits between the VSDs 12a, 12b, 12c and the motors 8a, 8b, 8c, are omitted in order not to obfuscate the figure.

As is well known in the art, the control system 11, or parts thereof, may be located above sea level, e.g. on board a vessel or on a platform, while other parts of the control system may be located subsea, e.g. in a unit located on the sea floor.

In the following, preparation and operation of the pumping system 1 will be disclosed in more detail with reference to FIG. 2.

The step of preparing the pumping system 1 for operation comprises mapping the pump limit characteristic for each of the parallel pumping units 2a, 2b, 2c in the system 1. FIG. 2 discloses such mappings in the form of a pump limit characteristic diagrams or curves 15a, 15b, 15c for each of the pumping units 2a, 2b, 2c. In each curve 15a, 15b, 15c, the minimum allowable torque of the pumping unit 2a, 2b, 2c is mapped as a function of the differential pressure across the pump 3a, 3b, 3c, DP, identifying a permissible operating region 16a, 16b, 16c and an impermissible operating region 17a, 17b, 17c of the pumping unit 2a, 2b, 2c. This step comprises, for each pumping unit 2a, 2b, 2c, identifying minimum allowable torque values $T_0a$, $T_0b$, $T_0c$ for different differential pressure values $DP_0a$, $DP_0b$, $DP_0c$, as is indicated in FIG. 2. Consequently, each pump limit characteristic curve 15a, 15b, 15c identifies minimum allowable torque values of the pumping unit 2a, 2b, 2c, below which minimum allowable torque values the pumping unit 2a, 2b, 2c runs the risk of entering into a surge situation.

Once established, the minimum allowable torques values $T_0a$, $T_0b$, $T_0c$ for each pumping unit 2a, 2b, 2c are stored in the control system 11, e.g. in a look-up table in the data storage unit 14, to provide reference values during the subsequent operation of the pumping system 1.

Figure 2:
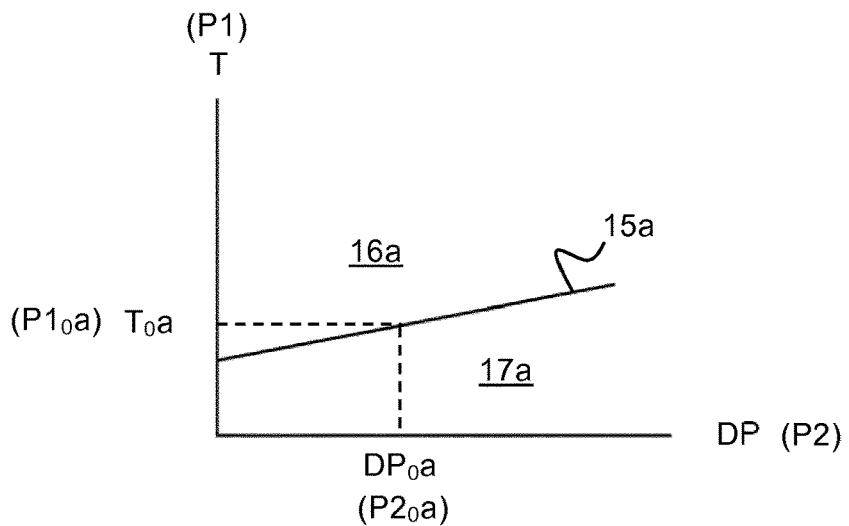
FIG. 2 discloses pump limit characteristic diagrams for pumps in the system according to FIG. 1.
Figure 2:
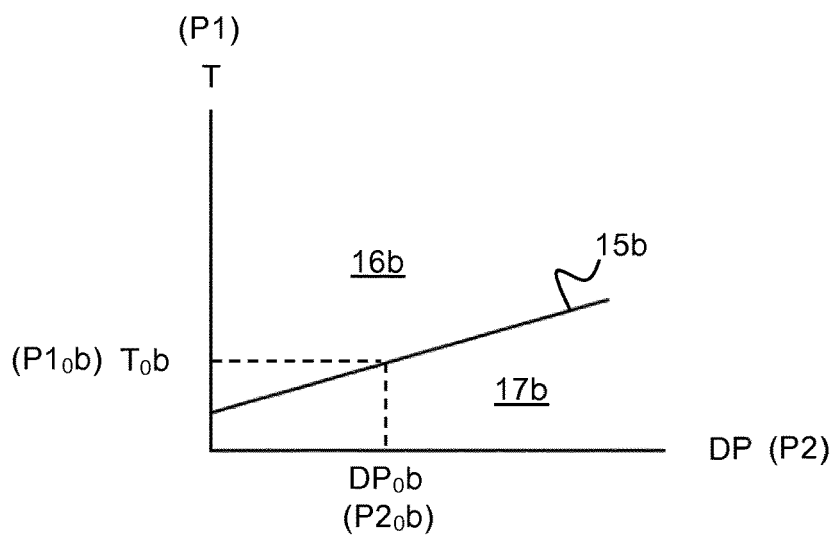
Figure 2:
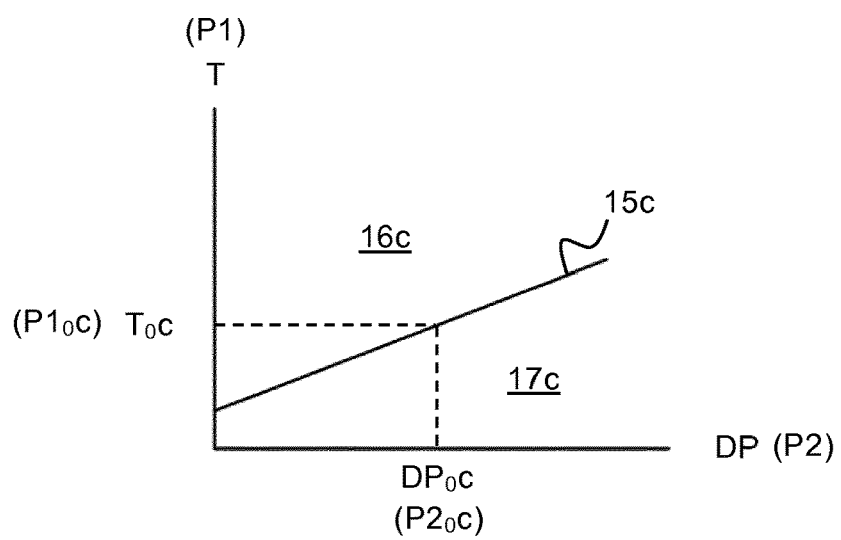

The manner of establishing pump limit characteristics diagrams as disclosed in FIG. 2 is beneficial since it has been revealed that the minimum pump torque required for upholding a sufficient differential pressure across the pumping units is valid for different gas volume fractions and fluid densities. Consequently, instead of requiring pump limit characteristics curves for different gas volume fractions or densities, only one pump limit characteristics curve 15a, 15b, 15c needs to be established for each pumping unit 2a, 2b, 2c. Therefore, each pump limit characteristics curve 15a, 15b, 15c defines torque values below which the pump may experience a pumping instability or surge, independent of the gas volume fraction and density of the fluid. As the curve 15a, 15b, 15c separates a permissible operating region 16a, 16b, 16c from an impermissible operating region 17a, 17b, 17c of the pumping unit 2a, 2b, 2c, it is possible, for every differential pressure value $DP_0a$, $DP_0b$, $DP_0c$, to identify a minimum allowable torque value, $T_0a$, $T_0b$, $T_0c$, which shall not be undercut.

During operation of the pumping system 1, the torque of each pumping unit 2a, 2b, 2c and the differential pressure across the pump 3a, 3b, 3c of the pumping unit 2a, 2b, 2c are monitored such that a monitored torque value $T_ma$, $T_mb$, $T_mc$ and a monitored differential pressure value $DP_ma$, $DP_mb$, $DP_mc$ are acquired for each pumping unit 2a, 2b, 2c.

When monitoring the torques, the most accurate torque values are generally obtained by measuring the pump torque directly at the pump shafts. If this is not available, it may be advantageous to sample the torque value $T_ma$, $T_mb$, $T_mc$ from the variable speed drives 12a, 12b, 12c. If power losses in the motor and in the cables which supply the motor are compensated for, the true torque at the motor shaft can be estimated based on signals sampled in the variable speed drive. Consequently, in the variable speed drives 12a, 12b, 12c, signals indicative of the shaft torques are readily available.

The differential pressure may advantageously be monitored using pressure sensors 18a, 18b, 18c positioned at the pumps 3a, 3b, 3c.

For each monitored differential pressure value, $DP_ma$, $DP_mb$, $DP_mc$, the corresponding minimum allowable torque values $T_0a$, $T_0b$, $T_0c$ are identified from the pump limit characteristics curves 15a, 15b, 15c which are stored in the control system 11, e.g. by retrieving the minimum allowable torque values $T_0a$, $T_0b$, $T_0c$ from a look-up table in the data storage unit 14.

Thereafter, for each pumping unit 2a, 2b, 2c, the rotational speed of the pumps are regulated such that the relation between the monitored torque value $T_ma$, $T_mb$, $T_mc$ are maintained the same as the relation between the identified minimum allowable torque values $T_0a$, $T_0b$, $T_0c$. In other words, the rotational speed of the pumps 3a, 3b, 3c are regulated such that following relationships are held true.

$$T_ma/T_0a = T_mb/T_0b = T_mc/T_0c$$

During normal operation of the pump 3a, 3b, 3c, the motor current of the motor driving the pump, i.e. the current flowing in the windings of the pump motor 8a, 8b, 8c, will generally be proportional to the torque of the pumping unit 2a, 2b, 2c. Consequently, instead of mapping the differential pressure DP against the torque T directly, the differential pressure DP may alternatively be mapped against the winding current of the pump motor. Also, instead of using the differential pressure DP, it may be possible to use other parameters which are proportional to the differential pressure across the pump. Generally, it is possible to achieve the required mapping by mapping a suitable first parameter, P1 which is a function of the torque of the pumping unit 2a, 2b, 2c as a function of a suitable second parameter, P2, which is a function of the differential pressure across the pump 3a, 3b, 3c, i.e. by finding minimum allowable first parameter values, $P1_0a$, $P1_0b$, $P1_0c$ for a sufficient number of second parameter values, $P2_0a$, $P2_0b$, $P2_0c$ as is disclosed in FIG. 2.

If such parameters are used, the first and second parameters P1, P2 of each pumping unit 2a, 2b, 2c are measured during operation of the pumping system such that a monitored first parameter value $P1_ma$, $P1_mb$, $P1_mc$ and a monitored second parameter value $P2_ma$, $P2_mb$, $P2_mc$ are acquired for each pumping unit 2a, 2b, 2c.

For each monitored second parameter value, $P2_ma$, $P2_mb$, $P2_mc$, the corresponding minimum allowable first parameter values $P1_0a$, $P1_0b$, $P1_0c$ are identified from the pump limit characteristics curves 15a, 15b, 15c which are stored in the control system 11.

Thereafter, for each pumping unit 2a, 2b, 2c, the rotational speed of the pumps are regulated such that the relation between the monitored first parameter value $P1_ma$, $P1_mb$, $P1_mc$ are maintained the same as the relation between the identified minimum allowable first parameter values $P1_0a$, $P1_0b$, $P1_0c$. In other words, the rotational speed of the pumps 3a, 3b, 3c are regulated such that following relationships are held true.

$$P1_ma/P1_0a = P1_mb/P1_0b = P1_mc/P1_0c$$

Consequently, according to the invention, if the pumping units 2a, 2b, 2c are identical, they will have the same pump limit characteristic and, consequently, the same minimum allowable torque value $T_0a$, $T_0b$, $T_0c$ (or the same minimum allowable first parameter value $P1_0a$, $P1_0b$, $P1_0c$). In such a case, the rotational speed of the pumps should be regulated such that the monitored torque values $T_ma$, $T_mb$, $T_mc$ (or the monitored first parameter values $P1_ma$, $P1_mb$, $P1_mc$) are the same for all pumping units 2a, 2b, 2c. However, if the pumping units 2a, 2b, 2c have different pump limit characteristics and, consequently, different minimum allowable torque values $T_0a$, $T_0b$, $T_0c$ (or different minimum allowable first parameter values $P1_0a$, $P1_0b$, $P1_0c$), the rotational speed of the pumps 3a, 3b, 3c should be regulated such that the ratio between the monitored torque values $T_ma$, $T_mb$, $T_mc$ (or the monitored first parameter values $P1_ma$, $P1_mb$, $P1_mc$) follows the ratio between the minimum allowable torque values $T_0a$, $T_0b$, $T_0c$ (or the minimum allowable first parameter values $P1_0a$, $P1_0b$, $P1_0c$).

By regulating the rotational speed of the pumps 3a, 3b, 3c in this manner, it is assured that the pumping units 2a, 2b, 2c reach their respective minimum flow limits at the same time, at which time the control unit 11 can regulate the control valve 10 to open such that fluid can be recycled in the return conduit 9, whereby pump surging can be avoided.

In the preceding description, various aspects of the invention have been described with reference to the illustrative embodiment. For purposes of explanation, specific numbers, systems and configurations were set forth in order to provide a thorough understanding of the invention and its workings. However, this description is not intended to be interpreted in a limiting sense. Various modifications and variations of the illustrative embodiment, as well as other embodiments of the apparatus, which are apparent to persons skilled in the art to which the disclosed subject matter pertains, are deemed to lie within the scope of the present invention.

The invention claimed is:

1. A method of sharing load between a plurality of parallel fluid pumps in a subsea fluid pumping system, said subsea fluid pumping system comprising:

a first fluid pumping unit comprising a first pump and a first motor which is drivingly connected to the first pump, the first pump comprising a suction conduit which is in fluid communication with a fluid inlet conduit and a discharge conduit which is in fluid communication with a fluid outlet conduit;

a second fluid pumping unit comprising a second pump and a second motor which is drivingly connected to the second pump, the second pump comprising a suction conduit which is in fluid communication with the fluid inlet conduit and a discharge conduit which is in fluid communication with the fluid outlet conduit, thus rendering the second pumping unit parallel to the first pumping unit;

a return conduit which is connected between the fluid outlet conduit and the fluid inlet conduit, thus providing a feed-back path for a fluid from the fluid outlet conduit to the fluid inlet conduit; and a control valve which controls a flow of the fluid through the return conduit;

the method comprising the steps of:

establishing a pump limit characteristics diagram for the first pumping unit by mapping a minimal allowable torque of the first pumping unit as a function of a differential pressure across the first pump, and identifying a permissible operating region of the first pumping unit defined by a set of minimum allowable torque values for the first pumping unit;

establishing a pump limit characteristics diagram for the second pumping unit by mapping a minimal allowable torque of the second pumping unit as a function of a differential pressure across the second pump, and identifying a permissible operating region of the second pumping unit defined by a set of minimum allowable torque values for the second pumping unit;

monitoring the torque of the first pumping unit and the differential pressure across the first pump, acquiring a monitored torque value ($T_ma$) and a monitored differential pressure value ($DP_ma$) of the first pumping unit, and identifying the minimum allowable torque value ($T_0a$) of the first pumping unit corresponding to the monitored differential pressure value ($DP_ma$) of the first pumping unit;

monitoring the torque of the second pumping unit and the differential pressure across the second pump, acquiring a monitored torque value ($T_mb$) and a monitored differential pressure value ($DP_mb$) of the second pumping unit, and identifying the minimum allowable torque value ($T_0b$) of the second pumping unit corresponding to the monitored differential pressure value ($DP_mb$) of the second pumping unit; and regulating the rotational speed of the first and the second pumps such that $T_ma/T_0a$ equals $T_mb/T_0b$.

2. The method according to claim 1, further comprising the step of:

regulating the control valve such that the monitored torque value ($T_m a$) of the first pumping unit does not fall below the minimum allowable torque value ($T_0 a$) of the first pumping unit, and such that the monitored torque value ($T_m b$) of the second pumping unit does not fall below the minimum allowable torque value ($T_0 b$) of the second pumping unit.

3. The method according to claim 1, wherein said steps of establishing the pump limit characteristics diagrams for the first and the second pumping units are performed prior to operating the pumping system, and wherein said steps of monitoring the torque of the first pumping unit and the differential pressure across the first pump, monitoring the torque of the second pumping unit and the differential pressure across the second pump, and regulating the rotational speed of the first and the second pumps are performed at a predetermined interval during operation of the pumping system.

4. The method according to claim 1, wherein said steps of establishing the pump limit characteristics diagrams for the first and the second pumping units comprises storing the pump limit characteristics diagrams in a control system of the pumping system.

5. The method according to claim 4, wherein the step of storing the pump limit characteristics diagrams in the control system comprises storing said set of minimum allowable torque values for said first and second pumping units in look-up tables.

6. The method according to any one of claims 4 and 5, wherein the step of storing the pump limit characteristics diagrams in the control system comprises storing the pump limit characteristics diagrams in a data storage unit in the control system.

7. The method according to claim 1, wherein said fluid is a multiphase or a variable density fluid.

* * * * *